US008763500B2

(12) United States Patent
Mountz et al.

(10) Patent No.: US 8,763,500 B2
(45) Date of Patent: Jul. 1, 2014

(54) MULTI-SCALE MECHANISM

(71) Applicant: Mountz, Inc., San Jose, CA (US)

(72) Inventors: Bradley G. Mountz, Morgan Hill, CA (US); Daniel K. Ohlendorf, Alameda, CA (US); Yi-Min Wu, Taichung (TW)

(73) Assignee: Mountz, Inc., San Jose, CA (US)

( * ) Notice: Subject to any disclaimer, the term of this patent is extended or adjusted under 35 U.S.C. 154(b) by 0 days.

(21) Appl. No.: 13/929,674

(22) Filed: Jun. 27, 2013

(65) Prior Publication Data

US 2014/0007699 A1  Jan. 9, 2014

Related U.S. Application Data

(63) Continuation of application No. 12/831,989, filed on Jul. 7, 2010, now Pat. No. 8,495,935.

(60) Provisional application No. 61/270,422, filed on Jul. 7, 2009.

(51) Int. Cl.
*B25B 23/14* (2006.01)
*B25B 23/157* (2006.01)
*B25B 23/159* (2006.01)

(52) U.S. Cl.
USPC ............... 81/467; 81/473; 81/478; 81/481

(58) Field of Classification Search
CPC  B25B 23/1427; B25B 23/1422; B25B 23/14; G01L 5/24
USPC ........................................ 81/467, 472–483
See application file for complete search history.

(56) References Cited

U.S. PATENT DOCUMENTS

| 2,900,855 | A  | * | 8/1959  | Van Hoose      | 81/483  |
|-----------|----|---|---------|----------------|---------|
| 3,418,965 | A  | * | 12/1968 | Rabinow        | 116/232 |
| 3,763,724 | A  | * | 10/1973 | Green          | 81/477  |
| 3,847,038 | A  | * | 11/1974 | Green          | 81/477  |
| 4,655,104 | A  | * | 4/1987  | Blattner       | 81/483  |
| 6,029,551 | A  | * | 2/2000  | Wu             | 81/475  |
| 6,334,377 | B1 | * | 1/2002  | Wu             | 81/478  |
| 6,575,042 | B1 | * | 6/2003  | Rinner         | 73/847  |
| 6,742,418 | B2 | * | 6/2004  | Amami          | 81/57.39|
| 6,945,144 | B1 | * | 9/2005  | Cutler et al.  | 81/483  |
| 7,000,508 | B2 | * | 2/2006  | Li et al.      | 81/479  |
| 7,017,456 | B2 | * | 3/2006  | Berman         | 81/177.8|
| 7,765,900 | B2 | * | 8/2010  | Wu             | 81/467  |

(Continued)

*Primary Examiner* — Lisa Caputo
*Assistant Examiner* — Jonathan Dunlap
(74) *Attorney, Agent, or Firm* — Donald L. Bartels; Bartels Law Group

(57) ABSTRACT

A multi-scale mechanism comprising a rotatable driving shaft; a first scale mounted along the axis of said rotatable driving shaft, said scale including first and second sets of coarse scale divisions for indicating a coarse range of magnitude in two different systems of units as a function of the position of said first scale with respect to said rotatable driving shaft; a second scale for indicating a fine scale range of magnitude in one of said systems of units; a third scale for indicating a fine scale range of magnitude in the other of said systems of units; said third scale operatively connected to said rotatable driving shaft; and a gear assembly coupled to said rotatable driving shaft and connected to said second scale and said third scale, said gear assembly having a predetermined gear ratio such that said second scale and said third scale are each caused to move at the same time but at a different rate that is a function of their respective system of units.

16 Claims, 12 Drawing Sheets

(56) References Cited

U.S. PATENT DOCUMENTS

| | | | |
|---|---|---|---|
| 8,201,464 B2 * | 6/2012 | Anjanappa et al. | 73/862.21 |
| 2005/0155469 A1 * | 7/2005 | Li et al. | 81/479 |
| 2009/0320654 A1 * | 12/2009 | Wu | 81/478 |
| 2010/0050828 A1 * | 3/2010 | Anjanappa et al. | 81/467 |
| 2010/0275742 A1 * | 11/2010 | Chen | 81/467 |
| 2011/0036214 A1 * | 2/2011 | Potterfield | 81/467 |
| 2011/0113936 A1 * | 5/2011 | Chiang | 81/483 |

* cited by examiner

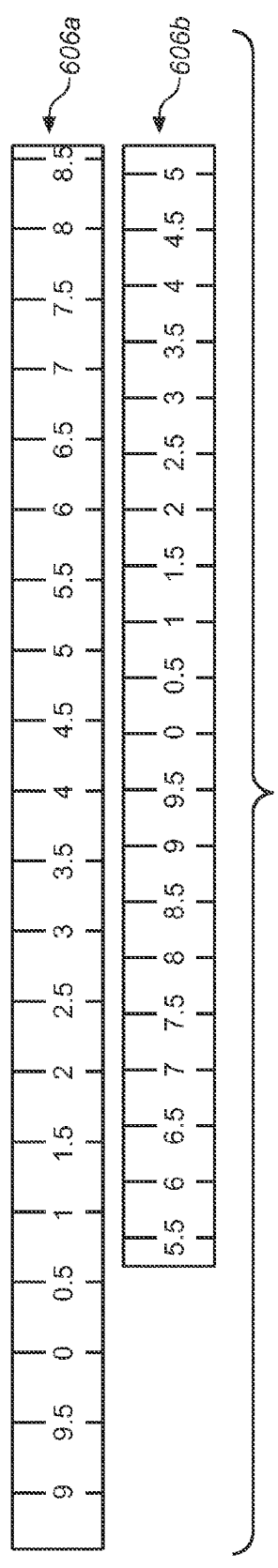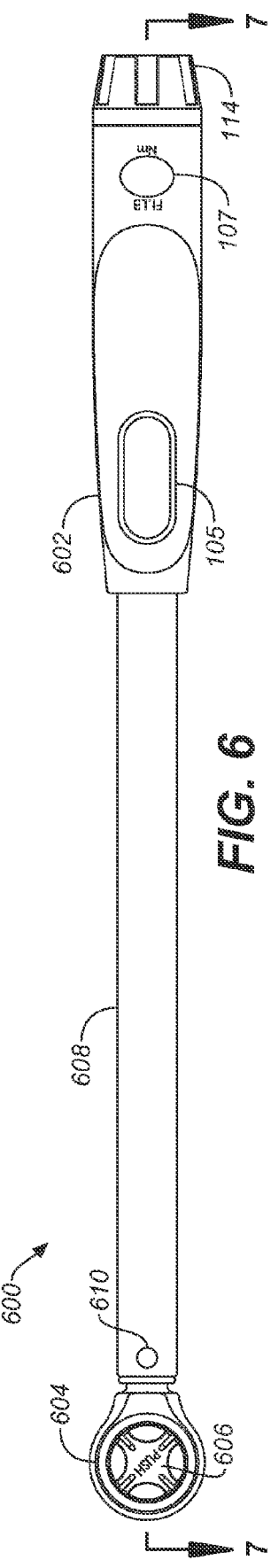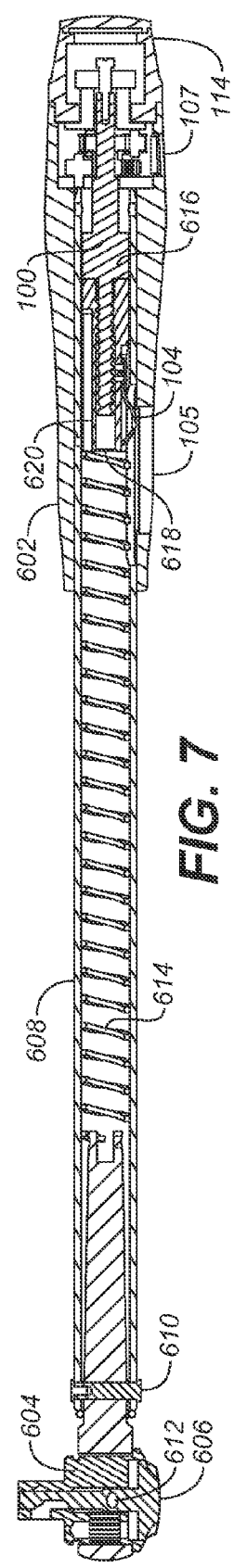
FIG. 5
FIG. 6
FIG. 7

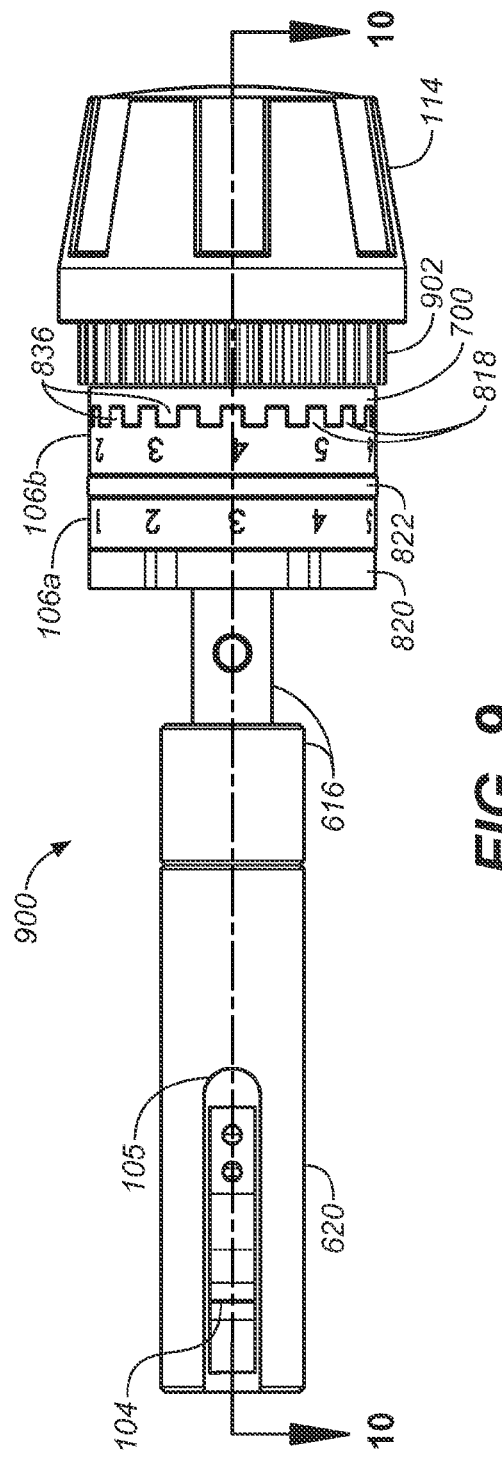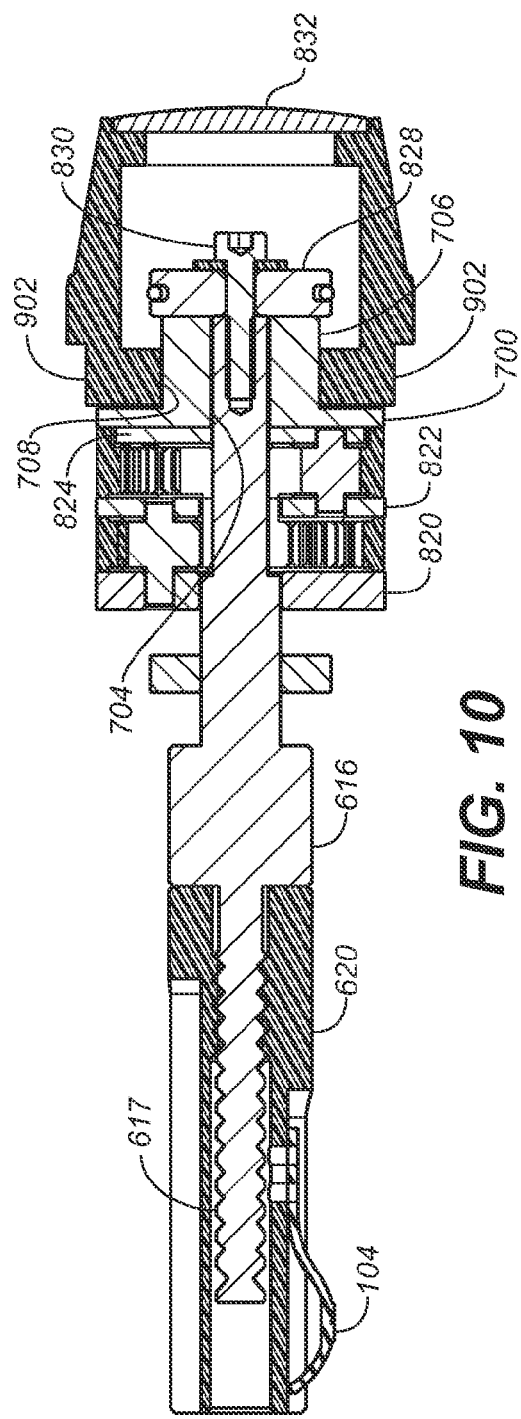

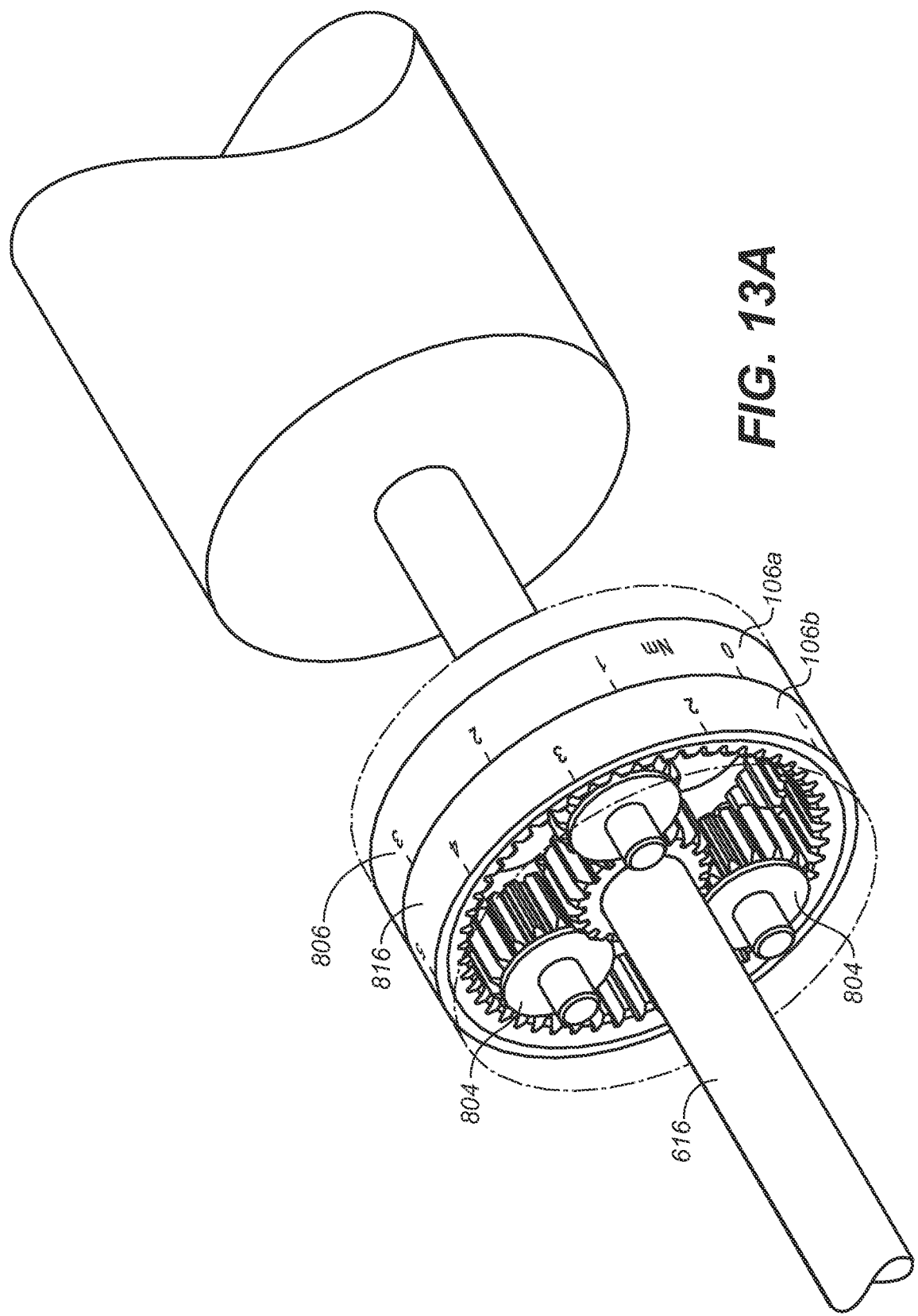

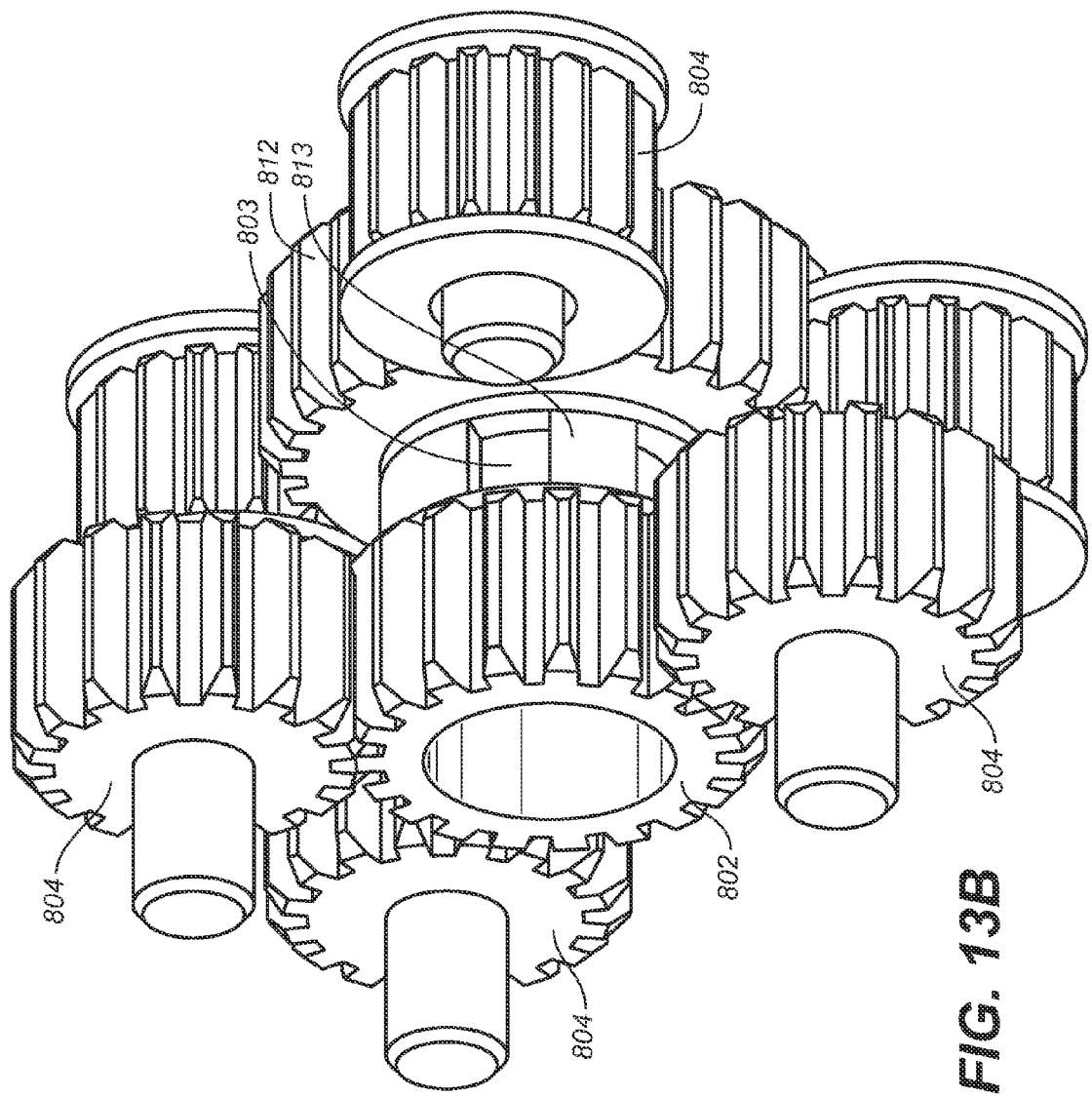

MULTI-SCALE MECHANISM

CROSS REFERENCE TO RELATED APPLICATIONS

This patent application is a continuation of, and claims priority to U.S. patent application Ser. No. 12/831,989, filed Jul. 7, 2010, now U.S. Pat. No. 8,495,935. The present application also claims priority to U.S. Provisional Patent Application Ser. No. 61/270,422, filed Jul. 7, 2009, and entitled Multi-Scale Tool, the entirety of which is incorporated herein by reference.

BACKGROUND

There are various techniques known in the art for providing a multi-scale mechanism for enabling continuously related measurements in, for example, an inch scale and a metric scale, in a micrometer designed to measure distance, or a foot pound scale and a Newton meter scale in a torque wrench designed to enable a predetermined amount of torque to be manually applied to a component, e.g., a fastener. One technique involves equipping a torque wrench with a first scale having two sets of coarse scale divisions for indicating a coarse range of torque magnitude in both foot pounds and Newton meters, and a second scale that works in combination with the first scale to indicate a fine scale range of values for one of the systems of units on the first scale, i.e., to provide an indication of a fine adjustment of the torque wrench in either foot pounds or Newton meters. No known prior art multi-scale mechanism enables the simultaneous viewing of both a coarse scale having coarse scale divisions in two different systems of units and separate second and third scales that provide continuously related respective fine adjustments in both systems of units.

SUMMARY OF THE INVENTION

In one embodiment, the present invention is a multi-scale mechanism comprising: a rotatable driving shaft; a first scale mounted along the axis of said rotatable driving shaft, said scale including first and second sets of coarse scale divisions for indicating a coarse range of magnitude in two different systems of units as a function of the position of said first scale with respect to said rotatable driving shaft; a second scale for indicating a fine scale range of magnitude in one of said systems of units; a third scale for indicating a fine scale range of magnitude in the other of said systems of units; said third scale operatively connected to said rotatable driving shaft; and a gear assembly coupled to said rotatable driving shaft and connected to said second scale and said third scale, said gear assembly having a predetermined gear ratio such that said second scale and said third scale are each caused to move at the same time but at a different rate as a function of their respective system of units.

In an alternate embodiment, the present invention is a multi-scale torque wrench comprising: a rotatable driving shaft; a first scale mounted along the axis of said rotatable driving shaft, said scale including first and second sets of coarse scale divisions for indicating a coarse range of magnitude in units of both foot pounds and Newton-meters as a function of the position of said first scale with respect to said rotatable driving shaft; a second scale for indicating a fine scale range of magnitude in one of said systems of units; a third scale for indicating a fine scale range of magnitude in the other of said systems of units; and a gear assembly coupled to said rotatable driving shaft and connected to said second scale and said third scale, said gear assembly having a predetermined gear ratio such that said second scale and said third scale are each caused to move at the same time but at a different rate as a function of their respective system of units.

In another embodiment, the present invention is a method for adjusting a tool to a desired value in either of two different systems of units, said tool including a first scale having a first set of coarse scale divisions in one of the systems of units and a second set of coarse scale divisions in the other of the systems of units, for simultaneously providing a coarse range of magnitude in both of said systems of units, a second scale for indicating a fine scale range of magnitude in one of said systems of units, and a third scale for indicating a fine scale range of magnitude in the other of said systems of units, said second and third scales operative to move at the same time but at a different rate as a function of their respective system of units, said method comprising: manually adjusting the tool to a desired coarse value by causing said tool to position an indicator adjacent to a desired value on said first scale using a selected one of said first set of coarse scale divisions or said second set of coarse scale divisions; and manually adjusting the tool to a desired fine value in the selected one of said systems of units by causing said tool to adjust said second and third scales such that the one of said second or third scales corresponding to the selected one of said systems of units indicates said desired fine value.

While particular embodiments in accordance with the invention have been specifically described within this Summary, it is noted that the invention and the claimed subject matter is not to be limited in any way by these descriptions.

BRIEF DESCRIPTION OF THE DRAWINGS

Some of the features, advantages, and benefits of the present invention will become more apparent from the following description taken in conjunction with the accompanying drawings, which are presented solely for exemplary purposes and not with the intent to limit the invention thereto. Note also that reference symbols or names are used in the Figures to indicate certain aspects or features shown therein, with reference symbols common to more than one Figure indicating like components, aspects or features shown therein. Lastly, note that the drawings referred to in this description should not be understood as being drawn to scale unless specifically noted.

FIG. 5 is a developed view of the second and third scales shown in FIG. 4, and illustrates two different scales that can be utilized as respective second and third scales in a multi-scale mechanism in accordance with various embodiments of the invention.

FIG. 6 is a top view of a multi-scale mechanism as in FIG. 1 incorporated into a torque wrench in accordance with various embodiments of the invention.

FIG. 7 is a cross-sectional view of the torque wrench shown in FIG. 6, taken along the lines 7-7.

FIG. 9 is a top view of a portion of a multi-scale mechanism wherein the gear assembly used to position the second and third scales is shown in a locked position.

FIG. 10 is a cross-sectional view of the multi-scale mechanism shown in FIG. 9, taken along the lines 10-10.

FIG. 13A is a schematic perspective view of a gear assembly and associated second and third scales in accordance with various embodiments of the invention, and FIG. 13B is a more detailed view of the sun gears and planetary gears in the gear assembly of FIG. 13A.

DETAILED DESCRIPTION

Figure 1A:
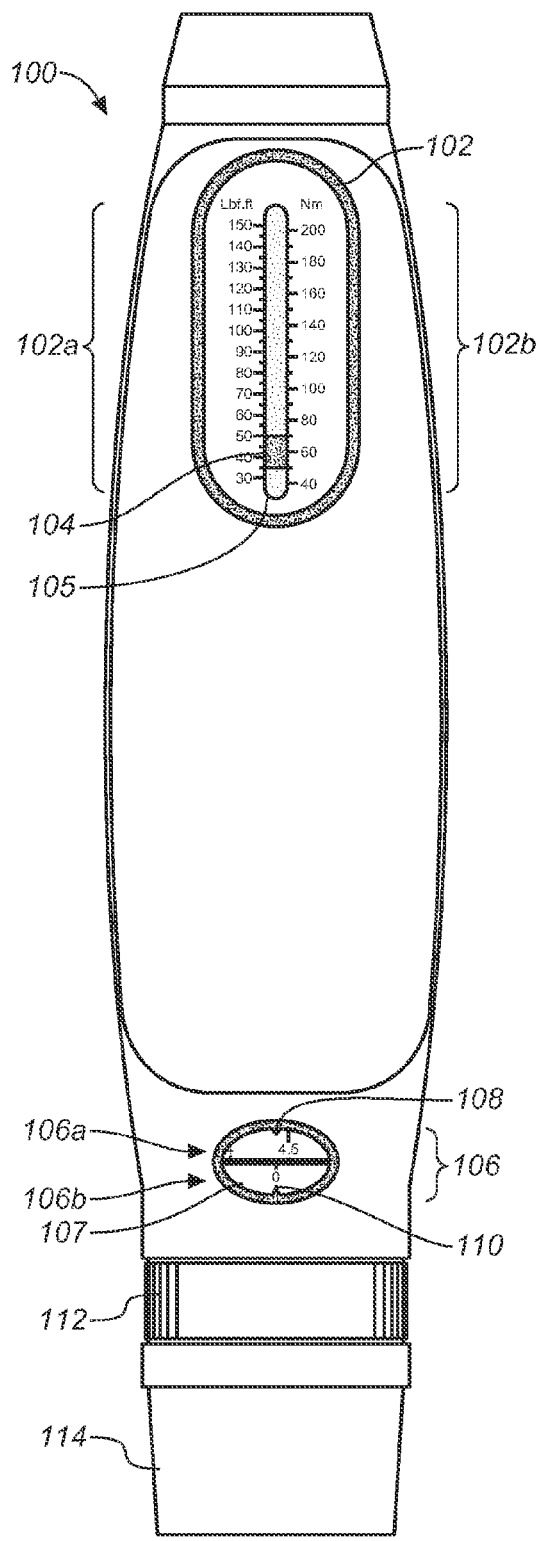
FIGS. 1A-1C show top views of a multi-scale mechanism in accordance with various embodiments of the invention with different scale settings.

FIG. 1A illustrates a multi-scale mechanism 100 in accordance with one embodiment of the invention. The multi-scale mechanism 100 can include, but is not limited to, a first coarse scale 102, and a fine scale 106 comprising second and third scales 106a and 106b. The multi-scale mechanism 100 preferably also includes a locking mechanism 112, and an adjustment knob or handle 114. The first scale 102 includes first and second sets of coarse scale divisions 102a and 102b for indicating a coarse range of magnitude in two different systems of units. The second scale 106a indicates a fine scale range of magnitude in one of said systems of units, and the third scale 106b indicates a fine scale range of magnitude in the other of said systems of units.

In one embodiment comprising a torque wrench or similar tool, the first scale 102 preferably includes two accurate coarse torque scales, a pound-force foot (Lbf.ft) scale (also commonly referred to as a foot-pound scale) and a Newton meter (Nm) scale. Note that the two accurate torque scales of the first scale 102, as well as their corresponding fine scales in respective second and third scales 106 are simultaneously presented (or viewable) to a user and are also simultaneously selectable by the user. As such, the multi-scale mechanism 100 can be independently and accurately set to a desired value, a desired torque value in this example, in either or both of the available systems of units.

In one embodiment, the first scale 102 can be utilized together with the second and third scales 106 to determine and set the torque value of the multi-scale torque wrench. For example, to determine the torque value setting of a multi-scale torque wrench, the torque value indicated by one of the torque scales of the first scale 102 can be added to the torque value indicated by the corresponding torque scale in one of the second and third scales 106. Note that the multi-scale mechanism 100 can be used in a wide variety of multi-scale torque tools, such as a click torque wrench, a cam-over torque wrench, a torque screwdriver, but is not limited to such applications.

In the first scale 102 of the present embodiment, note that its foot-pound scale 102a is shown on the left side while its Newton meter scale 102b is shown in on the right side. Additionally, a dual-headed arrow or similar indicator element 104 of the first scale 102 can be utilized in combination with the foot-pound scale 102a or the Newton meter scale 102b to indicate the torque value of the first scale 102. In fine scale 106, note that its foot-pound scale 106a is shown positioned in the top portion of a window or other opening 107, while its Newton meter scale 106b is shown positioned in the bottom portion of window 107. In addition, a pointer 108 or 110 can be used, respectively, in combination with the foot-pound scale 106a and the Newton meter scale 106b, to indicate the current torque value shown on the fine scale 106. In one embodiment, the first scale 102 and the second and third scales 106 can each be implemented with the same number (e.g., two or more) and types of torque scales. Moreover, the types of torque scales can include, but are not limited to, a Newton meter scale, a Newton centimeter scale, a Newton millimeter scale, a kilo Newton meter scale, a dyne meter scale, a dyne centimeter scale, a dyne millimeter scale, a kilogram-force meter scale, a kilogram-force centimeter scale, a kilogram-force millimeter scale, a gram-force meter scale, a gram-force centimeter scale, a gram-force millimeter scale, an ounce-force foot (foot-ounces) scale, an ounce-force inch (inch-ounces) scale, a pound-force foot (foot-pounds) scale, a long ton-force foot scale, a short ton-force foot scale, and the like.

In FIG. 1A, note that the first scale 102 and the fine scale 106 can be implemented in a wide variety of ways. For example in one embodiment, the first scale 102 and the second and third scales 106 can be implemented to include a wide variety of viewing areas, windows, or other openings. In one embodiment of the first scale 102, opening 105 can be implemented to expose the traveling range of the dual-headed indicator element 104 located between the foot-pound scale 102a and the Newton meter scale 102b. In one embodiment of the second and third scales 106a and 106b, opening 107 can be implemented as any shape (e.g., oval, circle, rectangle, square, polygon, and the like) that exposes a portion of the foot-pound scale 106a and the Newton meter scale 106b (which are coupled together in a manner as described herein). Furthermore, in various embodiments, the opening 105 for the first scale 102 and the opening 107 for the second and third scales 106a and 106b can each be implemented to include a substantially transparent material. In one embodiment of the first scale 102, a substantially transparent material (not shown) can be implemented to cover the foot-pound scale 102a, the Newton meter scale 102b, the opening 105, and the dual-headed arrow 104. In another embodiment of the first scale 102, a substantially transparent material (not shown) can be implemented to cover the dual-headed arrow 104 and the opening 105. In addition, in one embodiment of the second and third scales 106a and 106b, a substantially transparent material (not shown) can be implemented to cover the pointer 108, the pointer 110, along with the opening 107 over the foot-pound scale 106a and the Newton meter scale 106b. In another embodiment of the second and third scales 106a and 106b, a substantially transparent material (not shown) can be implemented to cover the opening 107.

In FIG. 1A, in one embodiment, the fine scale 106 is integral to the first scale 102, such that the first scale 102 operates or moves in relation with the operation or movement of the second and third scales 106a and 106b. As such, the second and third scales 106a and 106b in one embodiment are mechanically coupled to the first scale 102. In one embodiment, the adjustment knob or handle 114 of the multi-scale mechanism 100 is mechanically coupled to the first scale 102 and the second and third scales 106a and 106b. Thus, when the adjustment knob 114 is rotated, the first scale 102 operates or moves in relation with the operation or movement of the second and third scales 106a and 106b. In the present embodiment, the first scale 102 includes two torque scales (e.g., a foot-pounds scale and a Newton meter scale) that each represents their respective tens and hundreds torque values while the fine scale 106 includes two corresponding torque scales 106a and 106b that each represents their respective ones and 0.5 decimals torque values. For example, as a user of the multi-scale torque mechanism 100 twists the adjustment knob 114 in a clockwise or counter-clockwise direction, the torque scales of the second and third scales 106 rotate together in the same direction at different speeds while the dual-headed arrow 104 of the first scale 102 moves more slowly in a corresponding up or down direction. In other words, the movement of the second and third scales 106a and 106b is more rapid than the movement of the dual-headed arrow 104 of the first scale 102, as is expected, since the dual-headed arrow 104 indicates coarse adjustments while the fine scale 106 indicates fine adjustments in the torque value. Note that, in one embodiment, the movement of the second and third scales 106a and 106b can be an order of magnitude less than the corresponding movement of the first scale 102. Furthermore, in one embodiment, the difference in value of the second and third scales 106a and 106b can be one order of magnitude less than the difference in value of the first scale 102. Additionally in one embodiment, the difference in value of the second and third scales 106 can be a multiplier less than the difference in value of the first scale 102.

Note that the resolutions of the torque scales of the first scale 102 and second and third scales 106 can each be implemented in a wide variety of ways. For example, in an embodiment of the fine scale 106, the resolution of the foot-pounds scale 106a and the Newton meters scale 106b can each include indicators (or markers) at 0.5 increments with respect to their specific unit of measurement. Furthermore, in one embodiment of the fine scale 106, the resolution of the foot-pounds scale 106a and the Newton meters scale 106b can each include indicators (or markers) at 0.1 increments with respect to their specific unit of measurement. Note that in one embodiment, the resolution of the two or more scales (e.g., scales 106a and 106b) of the fine scale 106 can each be implemented with indicators (or markers) that are incremented by the same amount with respect to their specific unit of measurement. In this manner, the two or more scales of the fine scale 106 may have the same granularity. In one embodiment, the resolution of the two or more scales (e.g., scales 106a and 106b) of the fine scale 106 can each be implemented with indicators (or markers) that are incremented by different amounts with respect to their specific unit of measurement. In this fashion, the two or more scales of the fine scale 106 have different granularities.

In one embodiment, in order to set or fix the multi-scale mechanism 100 to a torque setting of 60 Newton meters as shown in FIG. 1A, a user can twist or rotate the adjustment knob or handle 114 until the dual-headed arrow 104 of the first scale 102 reaches approximately 60 Nm of the Newton meter scale 102b. While still rotating the adjustment knob 114, the user can then utilize the third scales 106b and its respective pointer 110 to accurately dial in the zero indicator (or marker) of the Newton meter scale 106b, thereby accurately setting the multi-scale mechanism 100 to a desired value of 60 Newton meters. After which, the user can engage the locking mechanism 112 to fix or establish or lock the torque value of the multi-scale mechanism 100.

In one embodiment, the multi-scale mechanism 100 enables the user to lock or set its torque value at any position, either at the scale indicators or markers of one of the torque scales (e.g., 106a and 106b) of the fine scale 106, or at any other point. Note that the locking mechanism 112 of the multi-scale mechanism 100 can be implemented with any known locking mechanism.

The first scale 102 and the second and third scales 106a and 106b can be further implemented in a wide variety of ways. For example, different techniques can be utilized to separately identify the corresponding torque scales of the first scale 102 and the second and third scales 106a and 106b. In one embodiment, the coarse and fine foot-pound scales 102a and 106a can be implemented with a first color that is different from a second color used to implement the coarse and fine Newton meter scales 102b and 106b. In this manner, the corresponding torque scales (or values) of the first scale 102 and the second and third scales 106a and 106b can be recognized more easily. In one embodiment, the foot-pound scales 102a and 106a can be labeled differently than the Newton meter scales 102b and 106b. In another embodiment, the foot-pound scales 102a and 106a can be both labeled and colored differently than the Newton meter scales 102b and 106b.

Furthermore, in one embodiment, the second and third scales 106 can be implemented to include two or more different torque scales (e.g., foot-pound scale 106a and Newton meter scale 106b). Specifically, a first torque scale (e.g., foot-pound scale 106a) of the second and third scales 106a and 106b can include a first plurality of equidistant indicators (or markers) that include a first fixed distance between adjacent indicators. In addition, a second torque scale (e.g., Newton meter scale 106b) of the second and third scales 106 can include a second plurality of equidistant indicators (or markers) that include a second fixed distance between adjacent indicators that is different than the first fixed distance. In this manner, the torque scale indicators of the second scale 106a are not aligned with the torque scale indicators of the third scale 106b. Since the distance between adjacent indicators (or markers) is different, the respective torque scales cannot be aligned. Furthermore in another embodiment, a third torque scale can be included in fine scale 106, to include a third plurality of equidistant indicators (or markers) that include a third fixed distance between adjacent indicators that is different than the first fixed distance and the second fixed distance in this embodiment of second scale 106a and third scale 106b, respectively. In this fashion, the scale indicators of each of the two or more different torque scales are not aligned. In accordance with the various above mentioned embodiments, the first scale 102 can be implemented in any manner similar to that described herein with reference to the fine scale 106, but is not limited to such.

In accordance with various embodiments, it is noted that the first scale 102 and the second and third scales 106 can be modified to be implemented as part of a multi-scale flow control device that may be utilized for controlling the flow of liquid, gas, and the like. For example in one embodiment, the first scale 102 and the fine scale 106 can each include two or more accurate flow scales. More specifically, in one embodiment, the first scale 102 and the second and third scales 106a and 106b can each be implemented with the same number (e.g., two or more) and types of flow scales. The type of flow scales can include, but are not limited to, liters per second scale, liters per minute scale, liters per hour scale, cubic feet per second scale, cubic feet per minute scale, gallons per second scale, gallons per minute scale, and the like. It is pointed out that, in various embodiments, when the first scale 102 and the second and third scales 106a and 106b are implemented as part of a multi-scale flow control device, they can be implemented, function, and/or operate in any manner similar to that described herein.

Figure 1B:
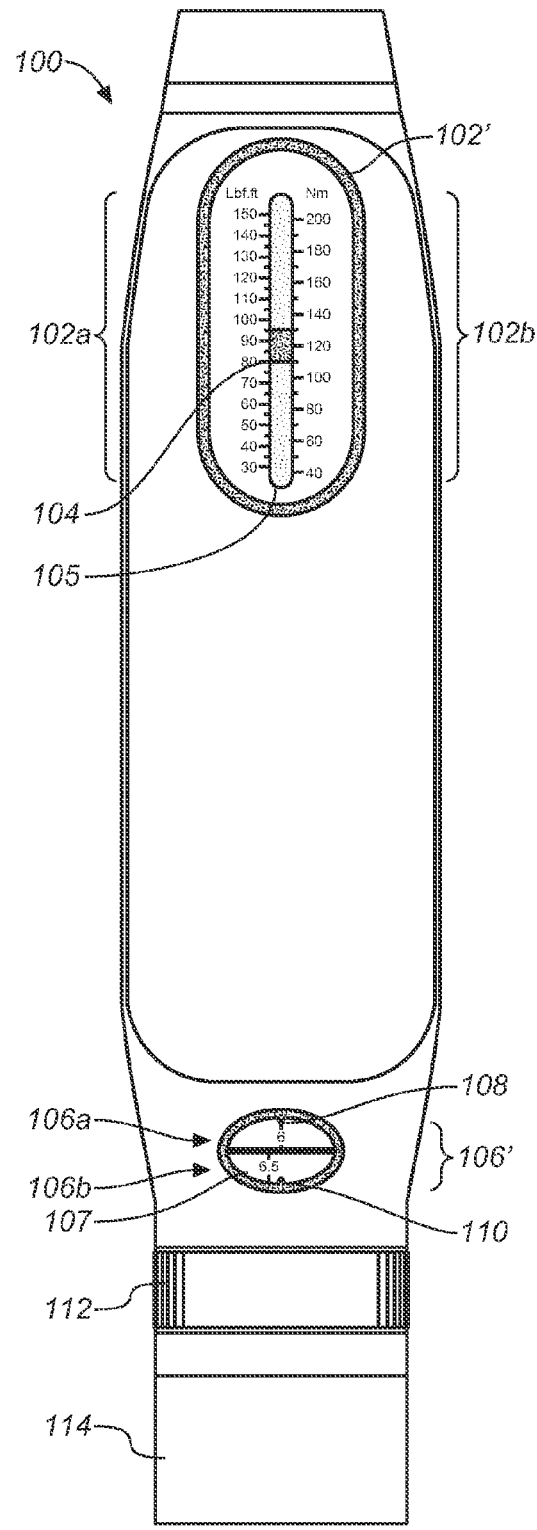

FIG. 1B illustrates a different torque setting of the multi-scale mechanism 100 in accordance with various embodiments of the invention. For example, in one embodiment, a user of a torque wrench embodiment of the multi-scale mechanism 100 may have a first fastener that is to be tightened to 86 foot-pounds (Lbf.ft). As such, the user dials or rotates the adjustment knob or handle 114 until the dual-headed arrow 104 of the first scale 102' is just above the 85 marker (or indicator) in the foot-pounds scale 102a. While still rotating the adjustment handle 114, the user can then utilize the fine scale 106' and its pointer 108 to accurately dial in the 6 marker (or indicator) of the second (foot-pound) scale 106a, thereby accurately setting the multi-scale mechanism 100 to the desired value of 86 foot-pounds. Then the user can engage the locking mechanism 112 in a first direction to fix (or establish or lock) the torque value of the torque wrench embodiment of the multi-scale mechanism 100 at 86 foot-pounds. Once the torque value is locked, the user can then utilize the torque wrench to tighten the first fastener to 86 foot-pounds.

After tightening the first fastener, there may be a second fastener nearby that is to be tightened to 117 Newton meters (Nm). As such, the user can unlock the multi-scale mechanism 100 by unlocking the locking mechanism 112 in a second direction. In addition, the user can realize that the multi-scale mechanism 100 is near the desired setting since the dual-headed arrow 104 of the first scale 102' is located between the 115 and 120 markers (or indicators) in the Newton meters scale 102b. Thus, the user can rotate the adjustment knob or handle 114 in a counter-clockwise direction until the pointer 110 of the fine scale 106' is lined up with the 7 marker (or indicator) of the Newton meter scale 106b, thereby accurately setting the multi-scale mechanism 100 to the desired value of 117 Newton meters. The user can then engage the locking mechanism 112 in the first direction to fix (or establish or lock) the torque value of the multi-scale mechanism 100 at 117 Newton meters. Once the torque value is locked, the user can then utilize the torque wrench in this embodiment to tighten the second fastener to 117 Newton meters. It is noted that, in one embodiment, neither the foot-pounds scale 106a nor the Newton meter scale 106b of the second and third scales 106' is more important than the other.

Figure 1C:
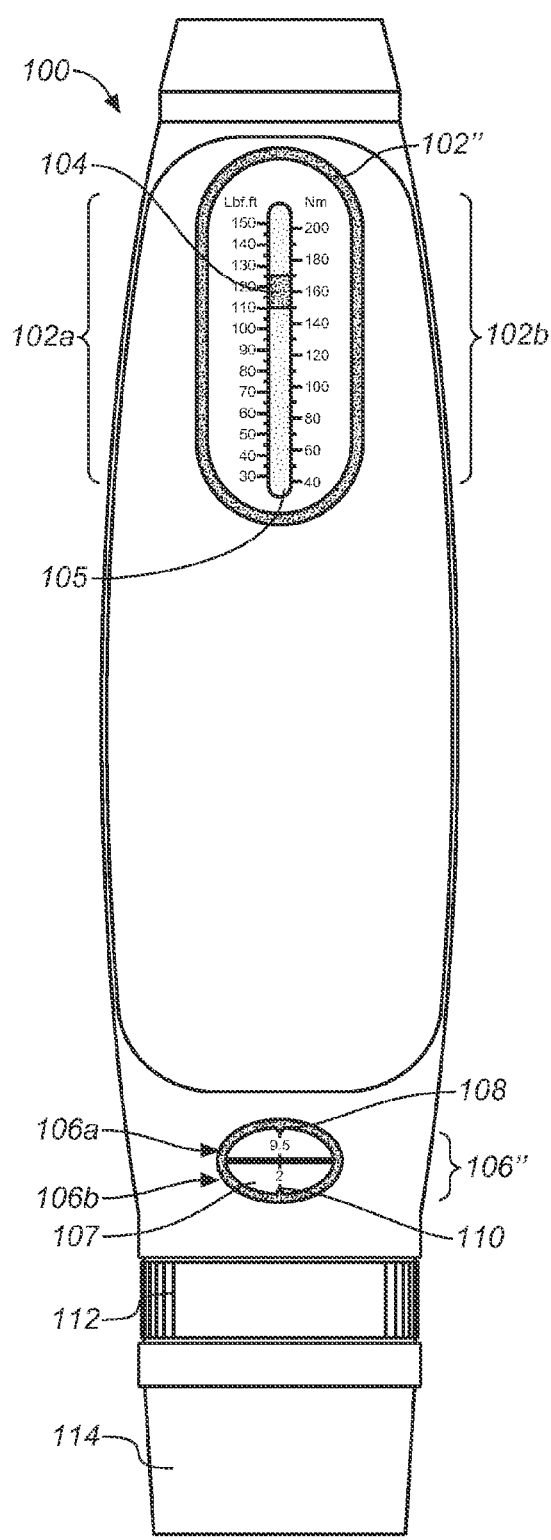

FIG. 1C illustrates another torque setting of the multi-scale mechanism 100 in accordance with various embodiments of the invention. For example in one embodiment, a user of the multi-scale mechanism 100 may have a fastener that is to be tightened to 162 Newton meters (Nm). As such, if the multi-scale mechanism 100 is locked, the user can unlock it by disengaging the locking mechanism 112. The user then dials or rotates the adjustment knob 114 until the dual-headed arrow 104 of the first scale 102" is above the 160 marker (or indicator) in the Newton meters scale 102b. While still twisting the adjustment knob or handle 114, the user can then utilize the fine scale 106" and its pointer 110 to accurately dial in the 2 marker (or indicator) of the Newton meter scale 106b, thereby accurately setting the multi-scale mechanism 100 to the desired value of 162 Newton meters. The user can then engage the locking mechanism 112 to fix (or establish or lock) the torque value of the multi-scale mechanism 100 at 162 Newton meters. Once the torque value is locked, the user can then utilize the torque wrench embodiment of the multi-scale mechanism 100 to tighten the fastener to 162 Newton meters.

Figure 2:
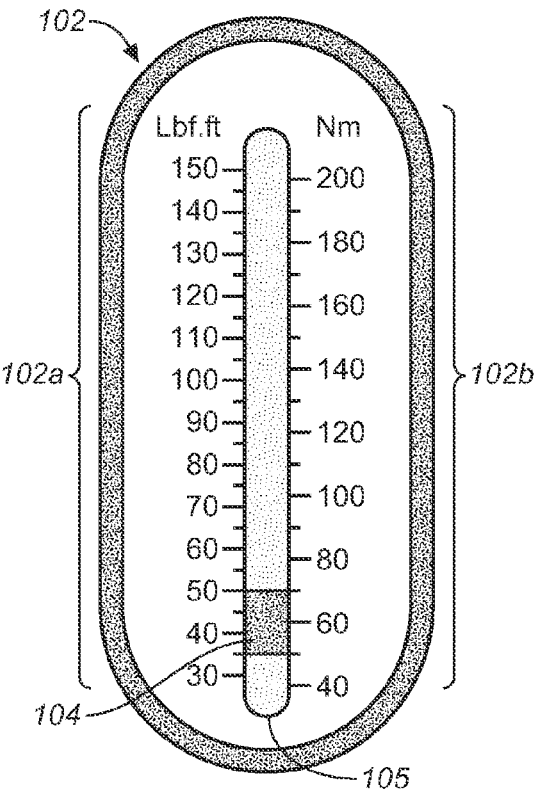
FIG. 2 illustrates a first scale of a multi-scale mechanism in accordance with various embodiments of the invention.

FIG. 2 illustrates in greater detail a first scale 102 of a multi-scale mechanism 100 in accordance with various embodiments of the invention. Specifically, the first scale 102 identifies the two or more units of measure (or scales) that are available on the multi-scale mechanism 100. In one embodiment, the first scale 102 includes a foot-pounds (Lbf.ft) scale 102a and a Newton meter (Nm) scale 102b. For example in the present embodiment, the multi-scale mechanism 100 is rated to 150 Lbf.ft and 200 Nm, wherein the foot-pounds scale 102a includes increments of 10 Lbf.ft from 30 Lbf.ft to 150 Lbf.ft while the Newton meter scale 102b includes increments of 10 Nm from 40 Nm to 200 Nm. The first scale 102 further includes a dual-headed arrow 104 that is utilized in combination with the foot-pounds scale 102a or the Newton meter scale 102b to indicate the torque value or setting of the multi-scale mechanism 100 with relation to either torque scale. In one embodiment of the first scale 102, a viewing area or opening 105 is implemented to expose the dual-headed arrow 104 as it is displaced either up or down during operation of the multi-scale mechanism 100 between the foot-pound scale 102a and the Newton meter scale 102b.

Figure 3:
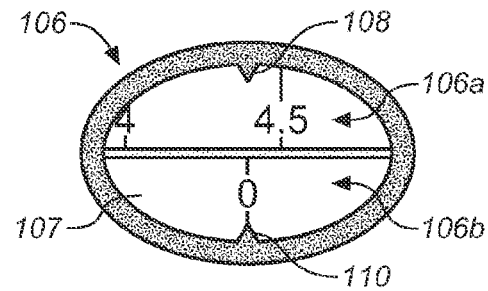
FIG. 3 illustrates second and third scales in a multi-scale mechanism in accordance with various embodiments of the invention as seen through a viewing window.

FIG. 3 illustrates second and third scales in a multi-scale mechanism 100 in accordance with various embodiments of the invention as seen through a viewing window. The second and third scales 106s and 106b of fine scale 102 identify the ones and decimal position of the two of more units of measure (or scales) that are available on the multi-scale mechanism 100. In one embodiment, the second and third scales 106 includes the same type and same number of scales as included in the first scale 102 of the multi-scale mechanism 100. In the present embodiment, the second scale 106a is a foot-pounds (Lbf.ft) scale and third scale 106b is a Newton meter (Nm) scale. In the present embodiment, the foot-pounds scale 106a may include increments or subdivisions of 0.5 Lbf.ft from 0 to 9.5 Lbf.ft while the Newton meter scale 106b may include increments or subdivisions of 0.5 Nm from 0 to 9.5 Nm.

In one embodiment, the fine scale 106 includes a pointer (or arrow) 108 to be used in combination with the foot-pound scale 106a to indicate the torque value or setting of the multi-scale mechanism 100 with relation to that torque scale. Additionally, in this embodiment, the fine scale 106 includes a pointer (or arrow) 110 to be used in combination with the Newton meter scale 106b to indicate the torque value or setting of the multi-scale mechanism 100 with relation to that torque scale. In one embodiment, the second and third scales 106a and 106b are viewed using a window or other opening 107 that can be implemented as any shape (e.g., oval, circle, rectangle, square, polygon, and the like) that exposes a portion of the foot-pound scale 106a and the Newton meter scale 106b.

Figure 4:
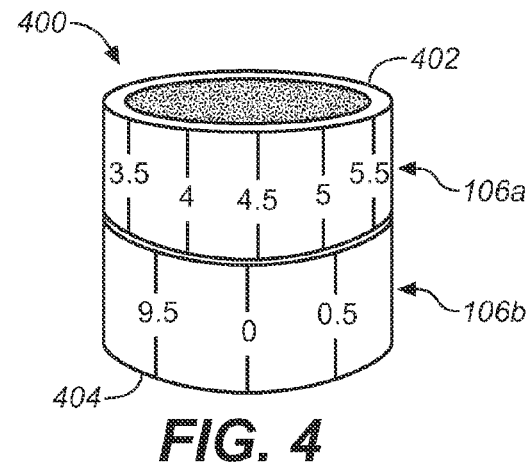
FIG. 4 is a perspective view of second and third scales in the form of circumferential bands in a multi-scale mechanism in accordance with various embodiments of the invention.

FIG. 4 illustrates a fine scale 400 of a multi-scale mechanism 100 in accordance with various embodiments of the invention. Specifically, the second and third scales 106a and 106b of fine scale 400 can be implemented as two bands (or rings or tubes) of material 402 and 404 having two different scales, respectively, such as, the foot-pounds (Lbf.ft) scale 106a and the Newton meter (Nm) scale 106b. Alternatively, the second and third scales 106a and 106b can be implemented as a closed-ended cylinder (which may be solid or hollow) of material. One or more additional bands of or cylinders of material can also be included having a third or more additional different scales. The second and third scales 106a and 106b can be implemented with a wide variety of materials. For example, the material may include any type of metal, any type of alloy, any type of plastic, any type of resin, and the like. Additionally, the scales 106a and 106b can be impressed, engraved, printed, or otherwise formed on their respective bands of material.

FIG. 5 is a developed view of the second and third scales shown in FIG. 4, and illustrates in greater detail two exemplary different scales that can be utilized as respective second and third scales 106a and 106b in a multi-scale mechanism 100 in accordance with various embodiments of the invention. FIG. 5 shows two different scales 406a and 406b that can be utilized as the second and third scales (e.g., the fine scale 106) of a multi-scale mechanism 100 in accordance with various embodiments of the invention. In one embodiment, the first scale 406a can be implemented as a foot-pounds (Lbf.ft) scale while the second scale 406b can be implemented as a Newton meter (Nm) scale. In one embodiment, the foot-pounds scale 406a may include increments of 0.5 Lbf.ft from 0 to 9.5 Lbf.ft while the Newton meter scale 406b may include increments of 0.5 Nm from 0 to 9.5 Nm. Note that, where the outer circumference of the radial gears on which second and third scales 106a and 106b are mounted are the same length, different length scales 106a and 106b as shown in FIG. 5 can be mounted by either be cutting one of the scales to fit the circumference or one of the scales can be overlapped at its end.

FIG. 6 illustrates the multi-scale mechanism 100 of FIG. 1 incorporated into a torque wrench 600 in accordance with various embodiments of the invention. A torque wrench is a conventional tool used to precisely apply a specific torque to a fastener such as a nut or bolt. A preferred method of presetting torque is with a calibrated clutch mechanism. At the point where the desired torque is reached, the clutch slips, signaling the desired torque and preventing additional tightening. The most common form of clutch uses a ball detent and a spring, with the spring preloaded by an adjustable screw thread, calibrated in torque units. The ball detent transmits force until the preset torque is reached, at which point the force exerted by the spring is overcome and the ball "clicks" out of its socket.

As shown in FIG. 7, a housing 602 in which the multi-scale mechanism 100 is contained is attached at one end to an otherwise conventional torque wrench 600. The housing 602 is preferably part of the handle of torque wrench 600. The main components of torque wrench 600 include a ratchet head 604, a ratchet lock 606, and a long handle 608 for connecting the housing 602 and the ratchet head 604. The long handle 608 is connected to the ratchet head by means of a rivet pin 610. As will be seen with reference to FIG. 7, the torque wrench 600 also includes a ball 612 contained in ratchet head 604 and a spring 614, for enabling the desired operation of the torque wrench 600.

Referring again to FIG. 6, openings 105 and 107 are formed in housing 602 to enable a user of the torque wrench 600 to view first scale 102 and second and third scales 106a and 106b, respectively. As also seen in FIG. 6, adjustment knob 114 is preferably positioned at the end of the housing 602 opposite to where the long handle 608 connects to housing 602.

FIG. 7 is a cross-sectional view of the torque wrench shown in FIG. 6, taken along the lines 7-7. As seen in FIG. 7, the multi-scale mechanism 100 is contained in housing 602. In the torque wrench 600 embodiment, multi-scale mechanism 100 preferably operatively engages a compression spring 614 contained within long handle 608. As the adjustment knob 114 is rotated, it preferably turns a rotatable driving shaft 616 which is threadably coupled to an adjustment cylinder 620. This rotation of driving shaft 616 causes adjustment cylinder 620 to move axially a precalibrated amount within long handle 608 in a direction depending on whether the adjustment knob 114 is rotated in a clockwise or counterclockwise direction. The front surface 618 of adjustment cylinder 620 is operatively coupled to spring 614 and causes spring 614 to either become more or less compressed as a function of the axial displacement of adjustment cylinder 620. The amount that spring 614 is compressed determines the force it applies to the ratchet head 604, to thereby control when ball 612 "clicks" out of its socket and causes the wrench 600 to slip. In other words, as is conventionally known, as the spring's load is increased, an increased force is applied to the ratchet head 604, thereby causing the force required to cause the torque wrench to slip to go up.

Figure 8:
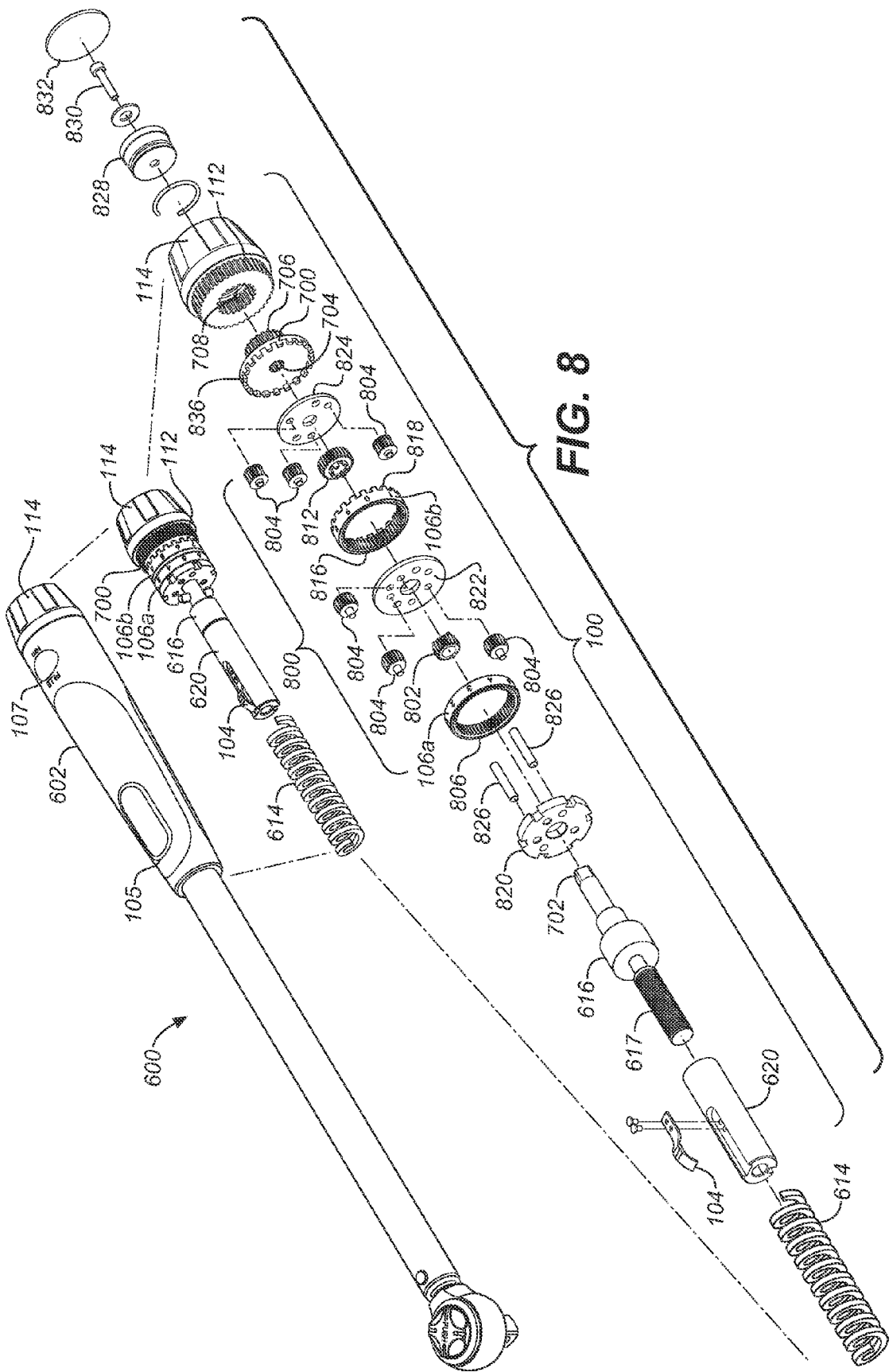
FIG. 8 is an exploded view of a portion of the torque wrench shown in FIG. 6, to illustrate various aspects of one embodiment of the invention.

FIG. 8 is an exploded view of a portion of the torque wrench shown in FIG. 6, to illustrate various aspects of one embodiment of the invention. Specifically, shown is an exploded view of the multi-scale mechanism 100 incorporated into torque wrench 600. As seen in FIG. 8, in one embodiment adjustment knob 114 is operatively connected to rotatable driving shaft 616. via a gear locking plate 700. Gear locking plate 700 includes a bore 704 that is pressed onto the end 702 of driving shaft 616 that is preferably in a hex shape. Gear locking plate 700 further includes a gear 706 that mates with an inner gear 708 formed in the center of adjustment knob 114. In operation, rotation of adjustment knob, turning of the knob causes gear locking plate 700 to turn in the same direction via gears 706 and 708, when adjustment knob 114 is in an unlocked position. The rotation of gear locking plate 700 is coupled to driving shaft 616 by the pressed connection of bore 704 to the end 702 of the driving shaft 616.

As mentioned above, rotatable driving shaft 616 is preferably threadably engaged to adjustment cylinder 620. In one embodiment, male threads 617 formed on shaft 616 and corresponding female threads (not shown) in adjustment cylinder 620, as described above. Attached to adjustment cylinder 620 is indicator element 104 which linearly moves along the axis of driving shaft 616 as a function of the position of adjustment cylinder 620 on the threads 617 of driving shaft 616. The position of indicator element 104 with respect to driving shaft 616 and cylinder 620 is calibrated with scales 102a and 102b, as seen in FIGS. 1 and 2, to provide an accurate indication of the amount of torque that the torque wrench 600 is preset to.

FIG. 8 also shows that second scale 106a of fine scale 106 is coupled to third scale 106b by a gear assembly 800. Gear assembly 800 comprising a first sun gear 802 that is axially and rotatably positioned on driving shaft 616, three planet gears 804 surrounding first sun gear 802, and a ring or annular gear 806 within which each of the planet gears rotate. The second scale 106a is mounted circumferentially on the outer cylindrical surface of ring gear 806. First sun gear 802 is coupled to a second sun gear 812 that is also axially and rotatably positioned on shaft 616. Sun gears 802 and 812 are axially coupled together by teeth that extend out axially from each gear towards the other gear, as best seen in FIG. 13. Gear assembly 800 further includes three planet gears 814 surrounding sun gear 812 and a ring or annular gear 816 within which each of the planet gears 814 rotate. The third scale 106b is mounted circumferentially on the outer cylindrical surface of ring gear 816. Both sun gears 802 and 812 rotate freely on driving shaft 616. Gear assembly 800 is held in place on shaft 616 by securing pins 826 along with a first gear plate 820 positioned at one end of first gear assembly 800, a second gear plate 822 positioned between the first gear assembly 800 and the second gear assembly 810, and a third gear plate 824 positioned between gear assembly 800 and gear locking plate 700.

In one embodiment, gear locking plate 700 drives ring gear 816 directly. Gear locking plate 700 preferably includes spur teeth 836 along its outer circumference and facing gear assembly 800. Ring gear 816 includes a plurality of teeth 818 formed on its rear edge in position and mates with gear teeth 836 on gear locking plate 700. In operation, in one embodiment, ring gear 816 rotates in direct relation to the rotation of adjustment knob 114 when it is in its unlocked position. The gear assembly 800 connected between said second scale and said third scale has a predetermined gear ratio such that said second scale is caused to move at a different rate than said third scale as a function of the movement of the adjustment knob 114.

Seat 828 and bolt 830 secure the adjustment knob 114 on gear 706 of gear locking plate 700. Element 832 is an end cap for the adjustment knob.

FIGS. 9 and 10 show a side view and a cross-sectional view of a portion of a multi-scale mechanism 900 as seen in FIG. 8, wherein the adjustment knob 114, and thus gear assembly 800, is shown in a locked position or state. FIG. 10 is a cross-sectional view of the multi-scale mechanism shown in FIG. 9, taken along the lines 10-10. In the locked position, teeth 902 on adjustment knob mesh with corresponding teeth 904 (not shown) formed on the inside of housing 602 teeth 904 are best seen in the cross-sectional view of when adjustment knob 114 is in an unlocked position, where it is positioned so that teeth 902 on adjustment knob 114 are not engaged with theeth 902 on housing 602.

In the locked position shown in FIGS. 9 and 10, since ht adjustment knob 114 in this embodiment is prevented from being rotated by a user, gear locking plate 700 is prevented from being rotated, and thus none of the scales 102, 106a, or 106b are able to move as well.

Figure 11:
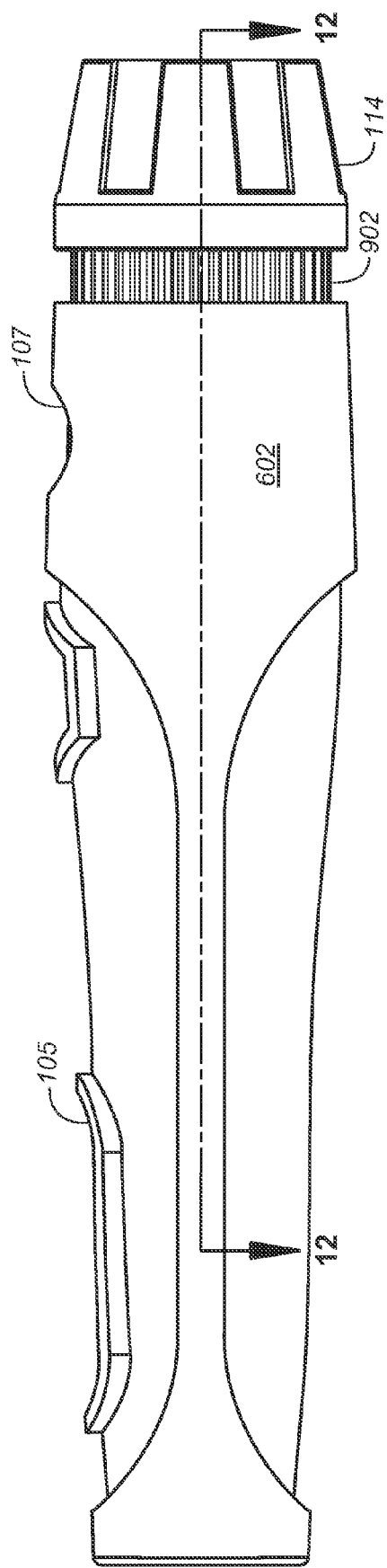
FIG. 11 is a side view of a portion of a multi-scale mechanism wherein the gear assembly used to position the second and third scales is shown in an unlocked position.
Figure 12:
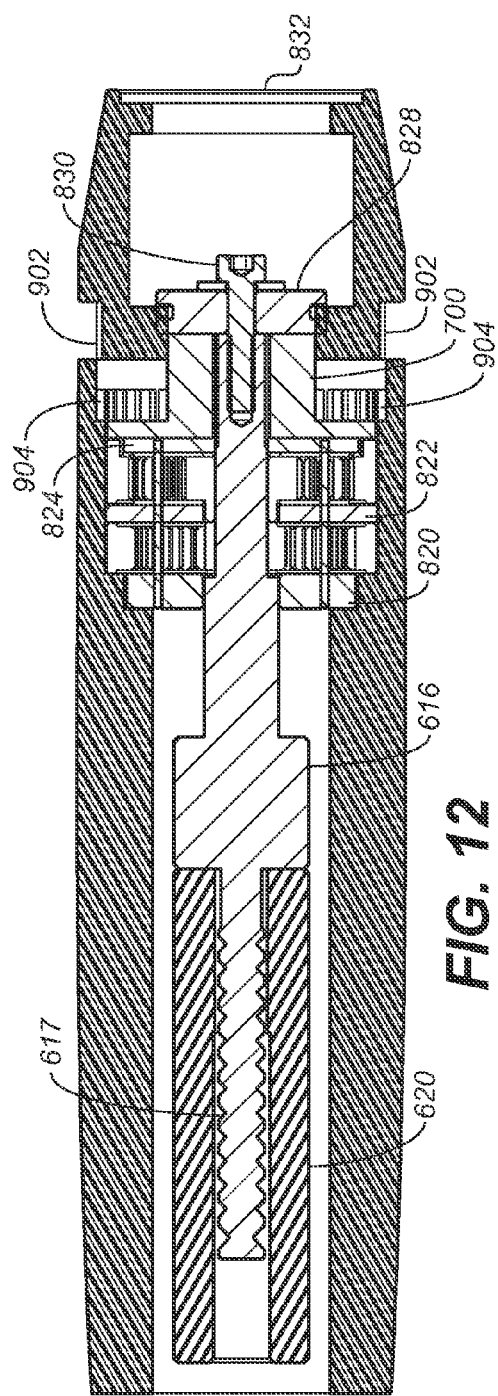
FIG. 12 is a cross-sectional view of the multi-scale mechanism shown in FIG. 11, taken along the lines 12-12

FIG. 11 is a side view of a portion of a multi-scale mechanism wherein the gear assembly used to position the second and third scales is shown in an unlocked position, and FIG. 12 is a cross-sectional view of the multi-scale mechanism shown in FIG. 11, taken along the lines 12-12.

FIG. 13A is a schematic perspective view of gear assembly 800 and associated second and third scales 106a and 106b in accordance with various embodiments of the invention. The gear teeth 818 on ring gear 816 have been omitted to simplify the figure. FIG. 13B is a more detailed view of the two planetary gear assemblies of gear assembly 800. More specifically, as seen in FIGS. 13A and 13B, said gear assembly comprises first and second planetary gear assemblies mounted adjacent to each other on said driving shaft, each including a sun gear 802, 812 rotatably mounted on said driving shaft, a plurality of planetary gears 804 arranged around each sun gear, and an outer annular gear 806, 816, said outer annular gear having a cylindrical outer surface on which is mounted a respective one of said second scale 106a or said third scale 106b. As is also seen each sun gear 802,812 is meshed to the other by side extending teeth 803, 813, respectively, such that the rotation of one of said outer annular gears 816 controls the rotation of the other of said annular gears 806, with the rate of rotation of annular gear 806 controlled by the difference in gear ratios between said first planetary gear assembly and said second planetary gear assembly.

Figure 14:
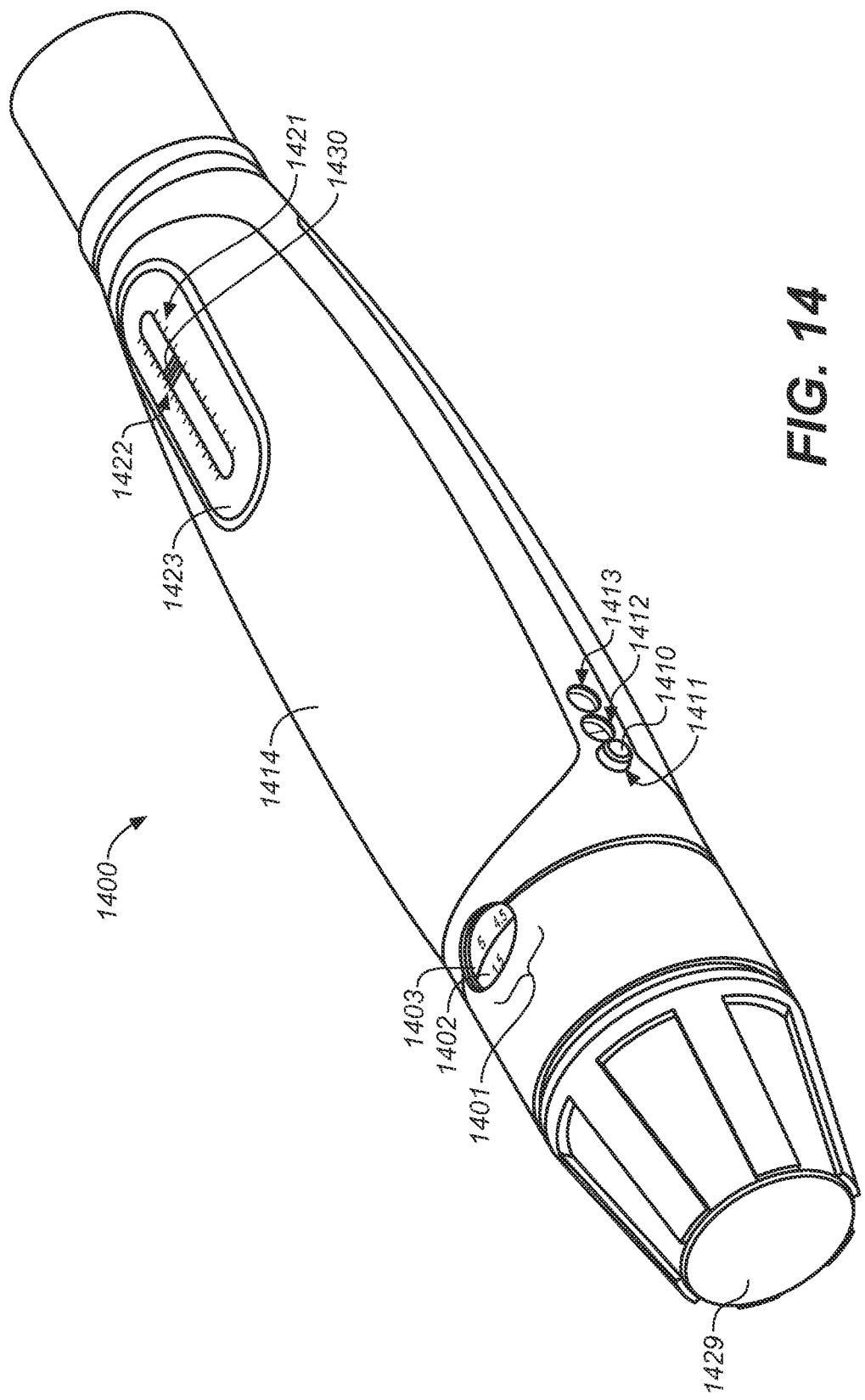
FIG. 14 is a perspective view of an alternate embodiment of a multi-scale mechanism in accordance with various embodiments of the invention.

FIG. 14 is a perspective view of an alternate embodiment of a multi-scale mechanism in accordance with various embodiments of the invention. FIG. 14 illustrates a handle portion of a multi-scale torque tool or drive 1400 in accordance with various embodiments of the invention. In the present embodiment, the multi-scale torque drive 1400 can include a handle 1414, a first (or major or linear) scale 1423, a second and third scales (or minor) scale 1401, a button locking mechanism 1410, and an adjustment feature 1429. In one embodiment, the first scale 1423 and the second and third scales 1401 can each include, but is not limited to, two accurate torque scales: a pound-force foot (Lbf.ft) scale (or foot-pound scale) and a Newton meter (Nm) scale. In addition, the second and third scales 1401 can further include a first radial torque scale indicator (e.g., Newton meter) 1402 and a second radial torque scale indicator (e.g., foot-pound) 1403. Note that the two accurate torque scales of both the first scale 1423 and the second and third scales 1401 (and its radial scales 1402 and 1403) are simultaneously presented (or viewable) to a user and are also simultaneously selectable by the user. Therefore, the multi-scale torque tool 1400 can be independently and accurately set to a desired torque value of either of the available torque scales. In one embodiment, the first scale 1423 can be utilized together with the second and third scales 1401 to determine and set the torque value of the multi-scale torque tool 1400. As such, the multi-scale torque tool or drive 1400 allows a user to set and view two different unit definitions on one mechanical torque device. In one embodiment, it is noted that the multi-scale torque tool or drive 1400 uses individual planetary gears for each radial scale unit (e.g., 1402 and 1403). The planetary gears are driven from a common source, but have ratios unique to the radial scale they represent. The user will be able to accurately set and lock the units independent of each other.

Figure 15:
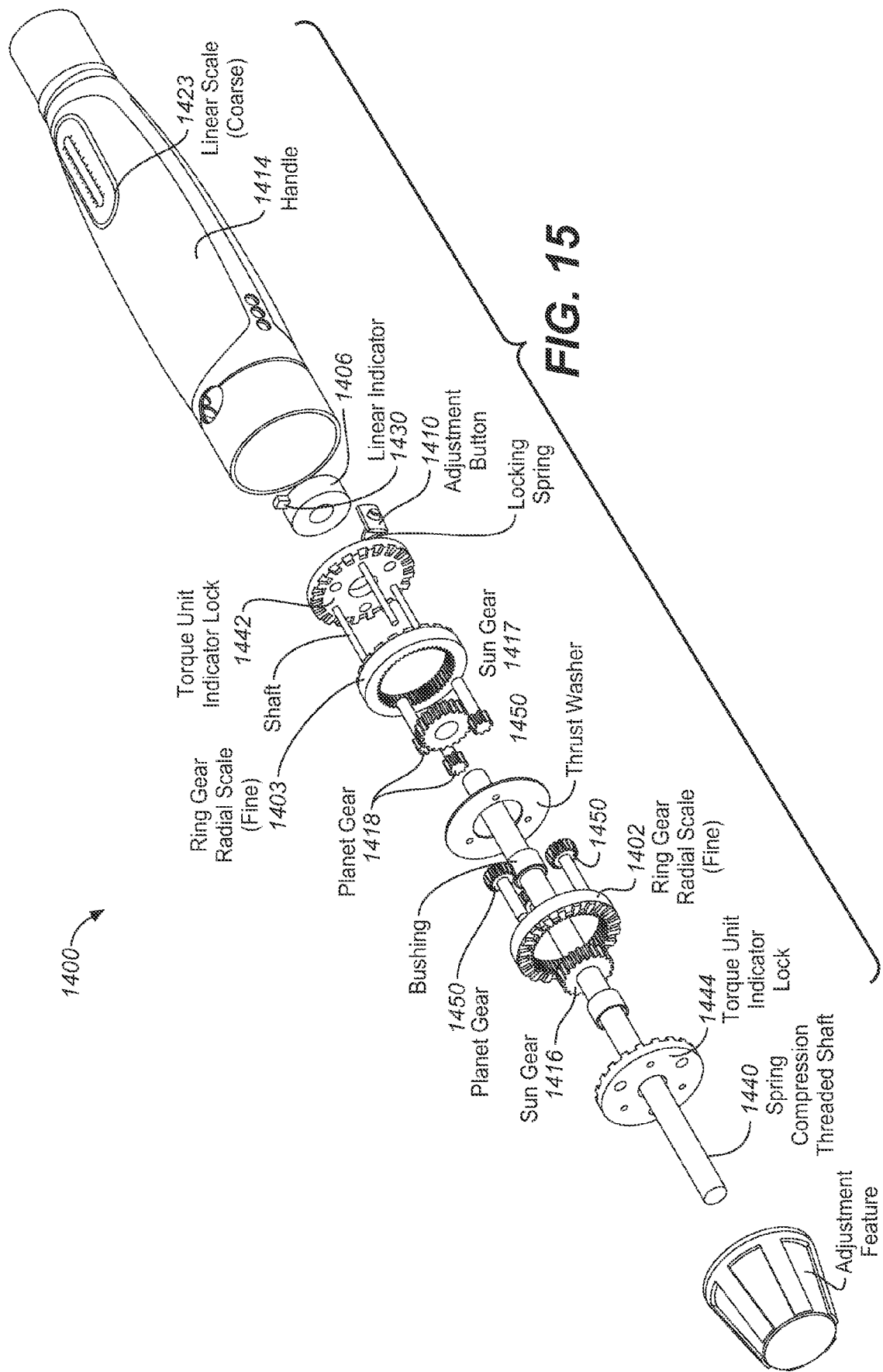
FIG. 15 is an exploded view of the multi-scale mechanism shown in FIG. 14.

With reference to FIGS. 14 and 15, where FIG. 15 is an exploded view of the multi-scale mechanism 1400 shown in FIG. 14, the ring gear 1402 will reference to Lbs-ft and the ring gear 1403 will reference to Nm. To set the Lbs-ft units, a user would unlock the multi-scale torque drive (or Dual Scale Display) 1400 by simultaneously (or at about the same time) pressing button 1410 on both sides of handle 1414 at location 1411 or 1413 and sliding it to location 1412. By turning the adjustment feature 1429 clockwise (CW) the user will also turn sun gear 1416 and sun gear 1417. The sun gears will turn their associated three planet gears 1450 and 1418, respectively, in counter-clockwise (CCW) direction. Note that in one embodiment the sun gears are different ratios and will drive their respective ring gears at different speeds. The planet gears 1450 and 1418 will turn their respective ring gears 1402 and 1403 in CW direction. In the present embodiment, the sun gear 1416 will be noted as the primary drive and sun gear 1417 will be noted as the secondary drive. In one embodiment, all drive ratios will be derived from the primary drive.

FIGS. 14 and 15 show the multi-scale torque drive 1400 assembly with one linear indicator 1423 and two separate radial indicators 1402 and 1403. Note that the units can be any combination of Metric, SI, Imperial, or other torque units of measure. It is noted that the units will be referred to as Lbs-ft and Nm. The assembly can also include, but is not limited to, a threaded set shaft 1440, torque unit indicator locks 1442 and 1444, bushings, and a thrust washer.

In operation of the multi-scale torque drive 1400, a user can set the torque by turning an adjustment feature 1429 at the end of the handle 1414 CW to increase torque setting, CCW to decrease torque setting. This adjustment feature 1429 may be a knob, rod, or separate tool, but is not limited to such. A switch 1410 allows the user to (A) lock wrench to primary units (at location 1413), (B) adjust wrench for either unit (at location 1412), or (C) lock wrench to secondary units (at location 1411). The linear scale 1423 defines the two scale units 1421 and 1422. A threaded traveler 1406 mounted to threaded shaft 1440 moves the indicator 1430 to the desired reading of major scale unit increments on the linear scale 1423. The radial scale 1402 and 1403 allow the user to fine adjust the minor scale unit increments. The main threaded rod (1) will turn both planetary gear sets 1418 and 1450 at different ratios preferably as a function of the relative sizes of sun gears 1416 and 1417. The primary planetary gear set 1450 drives radial scale 1402. The ratio to drive the secondary planetary gear set 1418, which drives radial scale 1403, will be driven by the primary planetary gear set 1450. This ratio can be defined by the scale units selected for the tool or wrench or drive (for example: x/y or y/z or x/z).

Figure 16:
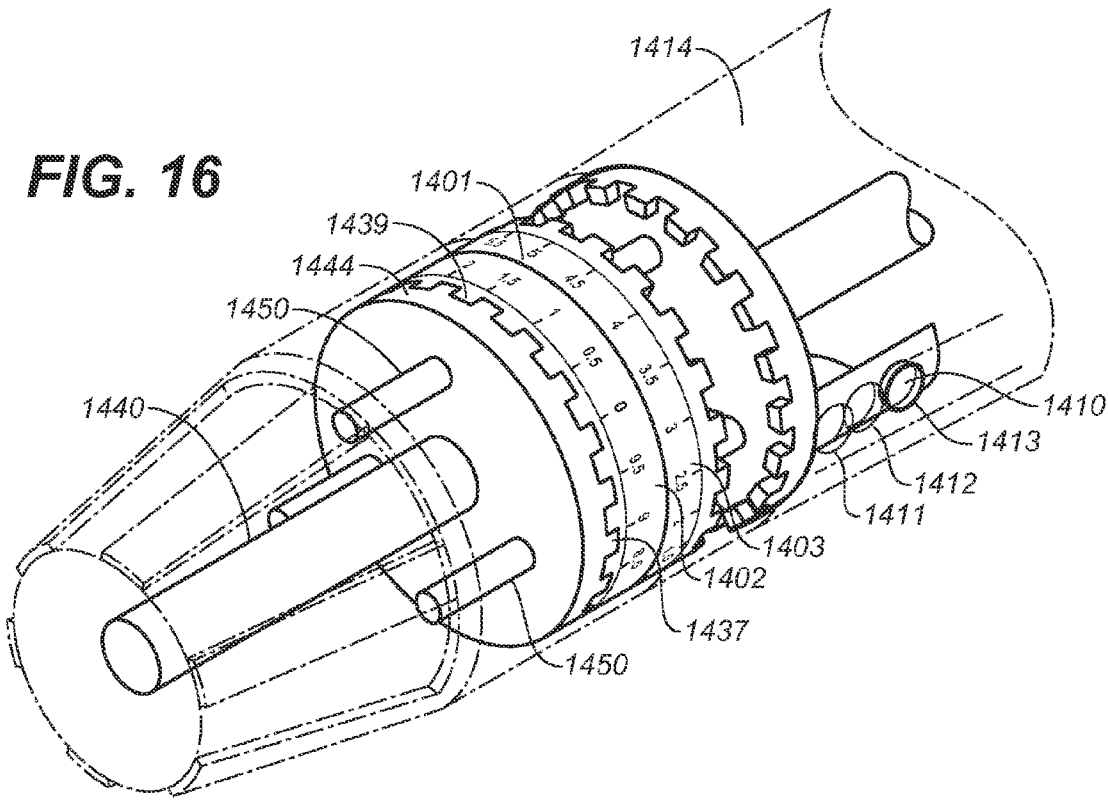
FIG. 16 is a perspective view of a portion of a multi-scale mechanism of FIG. 14 in a first locked position.

FIG. 16 shows the primary ring gear 1402 and secondary ring gear 1403 locked at location or position 1413. In one embodiment, the button 1410 is located on both sides of handle 1414, but is not limited to such. To release button 1410, the user will push in from both sides of 1414. Note that the teeth 1437 of sliding lock 1444 mesh with the teeth 1439 of ring gear 1402. The locking mechanism 1444 moves along the shafts of the planet gears 1450.

Figure 17:
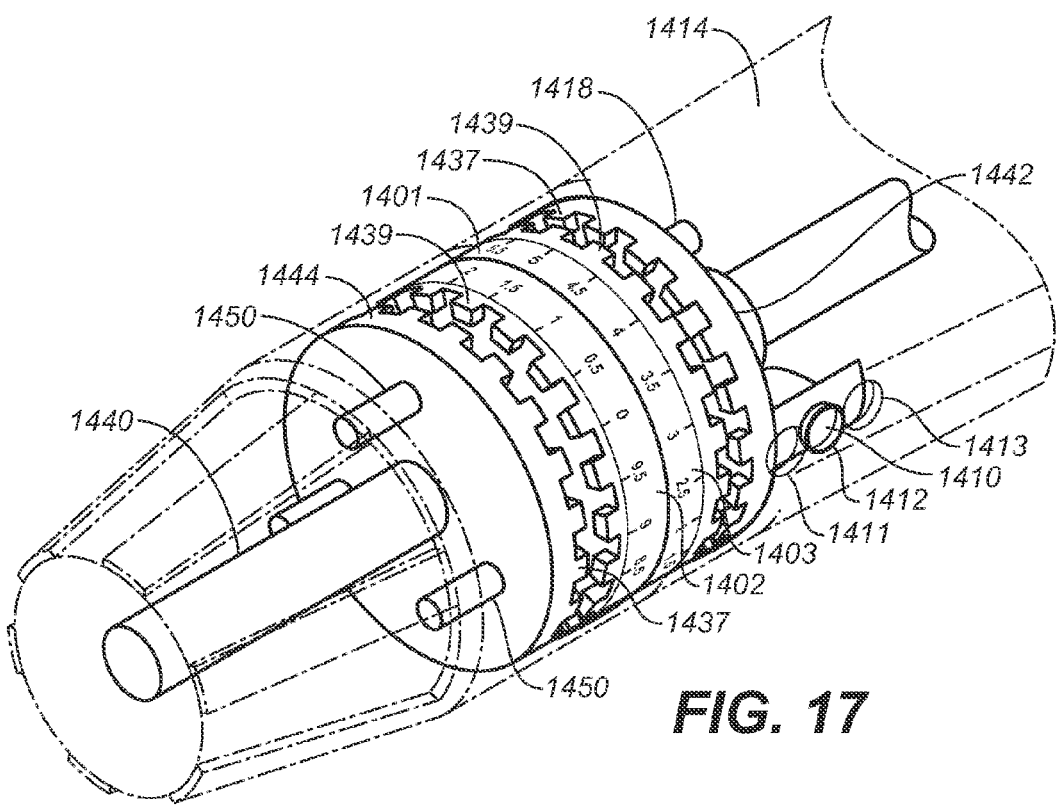
FIG. 17 is a perspective view of a portion of a multi-scale mechanism of FIG. 14 in an unlocked position.

FIG. 17 shows the primary ring gear 1402 and secondary ring gear 1403 in the adjust position at location or position 1412. In one embodiment, the button 1410 can be located on both sides of handle 1414. To release button 1410, the user pushes in from both sides of 1414, but is not limited to such. The teeth 1437 and 1439 of sliding locks 1442 and 1444, respectively, will be disengaged. As such, the user will now be able to adjust the torque to either scale unit of the multi-scale torque drive 1400.

Figure 18:
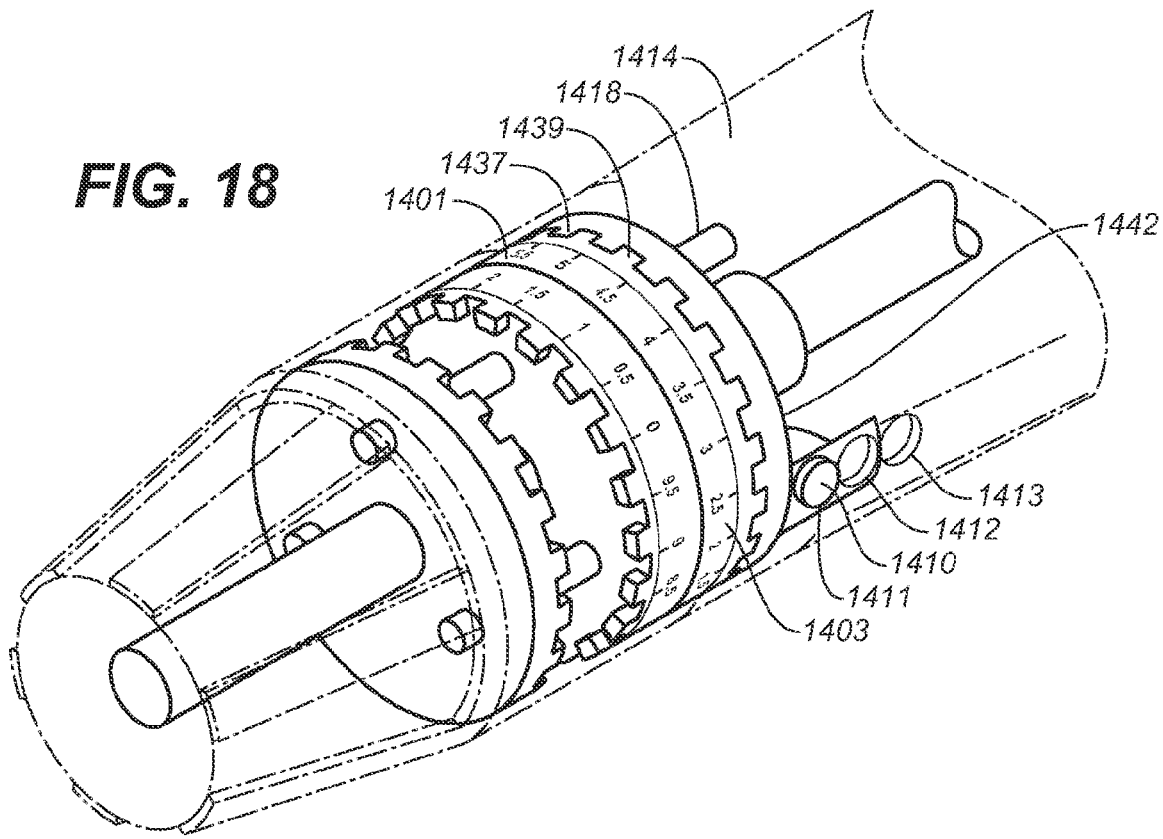
FIG. 18 is a perspective view of a portion of a multi-scale mechanism of FIG. 14 in a second locked position.
Figure 19:
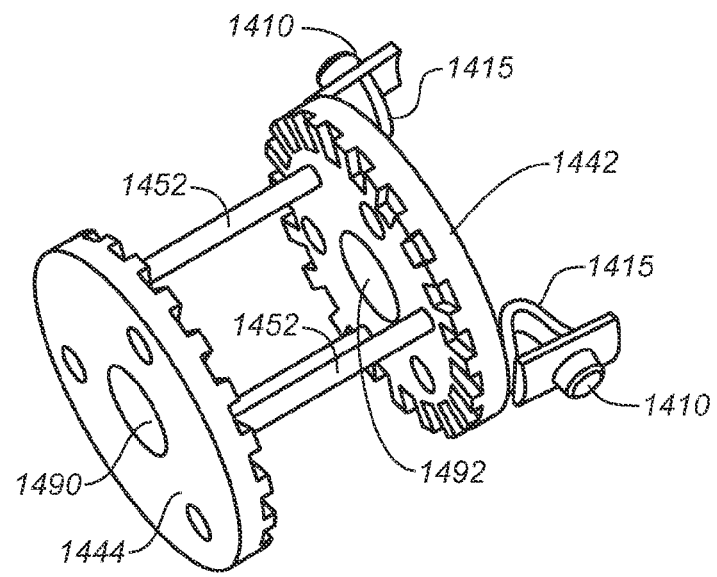
FIG. 19 is a perspective view of the locking mechanism of the multi-scale mechanism of FIG. 14.

FIG. 18 shows the secondary ring gear 1403 locked at location or position 1411. The teeth 1437 of sliding lock 1442 mesh with the teeth 1439 of ring gear 1403. The locking mechanism 1442 moves along the shafts of the planet gears 1418.

FIG. 17 shows details of a locking mechanism of the multi-scale torque drive 1400 in accordance with various embodiments of the invention. Outer locking keys 1442 and 1444 are coupled together by shafts 1452. The button return spring feature 1415 is part of locking key 1442. The button 1410 is attached to the button return spring 1415. The entire feature is allowed to slide axially along the threaded shaft 1440 located by the bores 1490 and 1492 in respective locking keys 1444 and 1442

The foregoing descriptions of various specific embodiments in accordance with the invention have been presented for purposes of illustration and description. They are not intended to be exhaustive or to limit the invention to the precise forms disclosed, and many modifications and variations are possible in light of the above teaching. The invention is to be construed according to the Claims and their equivalents.

What is claimed is:

1. A multi-scale mechanism comprising:
a rotatable driving shaft;
a first scale mounted along the axis of said rotatable driving shaft, said scale including first and second sets of coarse scale divisions for indicating a coarse range of magnitude in two different systems of units as a function of the position of said first scale with respect to said rotatable driving shaft;
a second scale for indicating a fine scale range of magnitude in one of said systems of units;
a third scale for indicating a fine scale range of magnitude in the other of said systems of units; said third scale operatively connected to said rotatable driving shaft; and
a gear assembly coupled to said rotatable driving shaft and connected to said second scale and said third scale, said gear assembly having a predetermined gear ratio such that said second scale and said third scale are each caused to move at the same time but at a different rate as a function of their respective system of units.

2. The multi-scale mechanism of claim 1, wherein the first set of scale divisions indicate a range of torque magnitudes in the system of units comprising foot-pounds, foot ounces, or inch ounces, and the second set of scale divisions indicate a range of torque magnitudes in the system of units comprising Newton-meters, Newton centimeters, or Newton millimeters.

3. The multi-scale mechanism of claim 1, wherein the first set of scale divisions indicate a range of torque magnitudes in the system of units taken from the group comprising the Imperial/American system of inch ounces, inch pounds, and foot pounds; the Standard International system of Newton millimeter, Newton centimeter, and Newton meter; and the Metric system of grams force centimeters, kilograms force centimeters, and kilogram force meters, and wherein the second set of scale divisions indicate a range of torque magnitudes in a different system of units taken from the group comprising the Imperial/American system of inch ounces, inch pounds, and foot pounds; the Standard International system of Newton millimeter, Newton centimeter, and Newton Meter; and the Metric system of grams force centimeters, kilograms force centimeters, and kilogram force meters.

4. The multi-scale mechanism of claim 1, wherein the first set of scale divisions indicate a range of distance magnitudes in the system of units comprising inches and the second set of scale divisions indicate a range of distance magnitudes in the system of units comprising the metric system.

5. The multi-scale mechanism of claim 1, wherein the first scale includes an indicator element that is threadably coupled to said input drive shaft for causing the indicator element to move with respect to said first and second sets of coarse scale divisions as a function of the number of rotations of said rotatable driving shaft.

6. The multi-scale mechanism of claim 1, wherein said gear assembly comprises first and second planetary gear assemblies mounted adjacent to each other on said driving shaft, each including a sun gear rotatably mounted on said driving shaft, a plurality of planetary gears arranged around said sun gear, and an outer annular gear, said outer annular gear having a cylindrical outer surface on which is mounted a respective one of said second scale or said third scale; and
wherein each said sun gear is meshed to the other such that the rotation of one of said outer annular gears controls the rotation of the other of said annular gears, with the rate of rotation of the other of said annular gears controlled by the difference in gear ratios between said first planetary gear assembly and said second planetary gear assembly.

7. The multi-scale mechanism of claim 1, wherein the first scale includes an indicator element that is threadably coupled to said input drive shaft for causing the indicator element to move with respect to said first and second sets of coarse scale divisions as a function of the number of rotations of said rotatable driving shaft; and wherein the multi-scale mechanism further comprises a housing within which said rotatable driving shaft and said gear assemblies are mounted, said housing assembly including a first transparent window for enabling a user to view said indicator element and said first scale, and wherein said first scale is mounted to said housing adjacent to said indicator element, and including a second transparent window for enabling a user to view a portion of the second and third scales.

8. The multi-scale mechanism of claim 7, wherein said first scale, said second scale, and said third scale are simultaneously viewable by a user, and wherein the user is enabled to adjust the mechanism to select a particular magnitude in either of said systems of units.

9. The multi-scale mechanism of claim 1, wherein the fine scale range of said second scale comprise subdivision marks of the first coarse scale divisions and the fine scale range of said third scale comprise subdivision marks of the second coarse scale divisions.

10. The multi-scale mechanism of claim 1, wherein the mechanism comprises a torque wrench.

11. The multi-scale mechanism of claim 1, further comprising an adjustment knob coupled to said rotatable driving shaft, said adjustment knob operative to enable a user to rotate the rotatable driving shaft in either direction when said adjustment knob is in a first position, and to prevent a user from rotating the driving shaft when said adjustment knob is in a second position.

12. A multi-scale torque wrench comprising:
a rotatable driving shaft;
a first scale mounted along the axis of said rotatable driving shaft, said scale including first and second sets of coarse scale divisions for indicating a coarse range of magnitude in units of both foot pounds and Newton-meters as a function of the position of said first scale with respect to said rotatable driving shaft;
a second scale for indicating a fine scale range of magnitude in one of said systems of units;
a third scale for indicating a fine scale range of magnitude in the other of said systems of units; and
a gear assembly coupled to said rotatable driving shaft and connected to said second scale and said third scale, said gear assembly having a predetermined gear ratio such that said second scale and said third scale are each caused to move at the same time but at a different rate as a function of their respective system of units.

13. The multi-scale torque wrench of claim 12, wherein said first scale, said second scale, and said third scale are simultaneously viewable by a user, and wherein the user is enabled to adjust the torque wrench to select a particular magnitude in either of said systems of units.

14. The multi-scale torque wrench of claim 12, wherein the first, second, and third scales are configured to enable a user to simultaneously establish a selected torque setting of said multi-scale torque wrench in both foot pound units and Newton-meter units.

15. A method for adjusting a tool to a desired value in either of two different systems of units, said tool including a first scale having a first set of coarse scale divisions in one of the systems of units and a second set of coarse scale divisions in the other of the systems of units, for simultaneously providing a coarse range of magnitude in both of said systems of units, a second scale for indicating a fine scale range of magnitude in one of said systems of units, and a third scale for indicating a fine scale range of magnitude in the other of said systems of units, said second and third scales operative to move at the same time but at a different rate as a function of their respective system of units, said method comprising:
manually adjusting the tool to a desired coarse value by causing said tool to position an indicator adjacent to a desired value on said first scale using a selected one of said first set of coarse scale divisions or said second set of coarse scale divisions; and
manually adjusting the tool to a desired fine value in the selected one of said systems of units by causing said tool to adjust said second and third scales such that the one of said second or third scales corresponding to the selected one of said systems of units indicates said desired fine value.

16. The method of claim 15, wherein said manual adjustments are made by manually rotating an adjustment knob operatively coupled to said first, second, and third scales, where rotation of said knob in one direction causes the coarse and fine values indicated on the respective said scales to increase and where rotation of said knob in the opposite direction causes the coarse and fine values indicated on the respective said scales to decrease.

\* \* \* \* \*